Nov. 19, 1929.  G. S. YERBY ET AL  1,736,688
VEHICLE SCREEN
Filed Jan. 28, 1929  2 Sheets-Sheet 1

Gordon S. Yerby and
John F. Hewitt
INVENTORS
BY Victor J. Evans
ATTORNEY

Nov. 19, 1929.  G. S. YERBY ET AL  1,736,688
VEHICLE SCREEN
Filed Jan. 28, 1929  2 Sheets-Sheet 2

Gordon S. Yerby and
John F. Hewitt   INVENTORS
BY *Victor J. Evans*
ATTORNEY

Patented Nov. 19, 1929

1,736,688

UNITED STATES PATENT OFFICE

GORDON S. YERBY AND JOHN F. HEWITT, OF PORTLAND, OREGON

VEHICLE SCREEN

Application filed January 28, 1929. Serial No. 335,650.

The object of this, our present invention, is the provision of a screen for the window or door openings for closed types of automobiles designed to filter the air entering the machine and prevent the passage of bugs or like insects as well as dust and dirt therethrough.

A further and important object is the construction of a screen for this purpose in which the frame is of strong but flexible material so that the same must be flexed when being inserted in the door or window casing, and which when expanded will retain the same practically in self-sustaining position, although we provde yieldable means for assisting in so holding the frame positioned.

A still further object is the provision of a screen for this purpose which is of a size so that the same will not fully cover the door or window opening and whereby, when the glass is fully opened a sufficient space will be left for the passage of the hand of the operator or occupants of the machine to signal traffic as to the direction to be taken by the machine.

To the attainment of the foregoing the invention consists in the improvement hereinafter described and definitely claimed.

Figure 1:
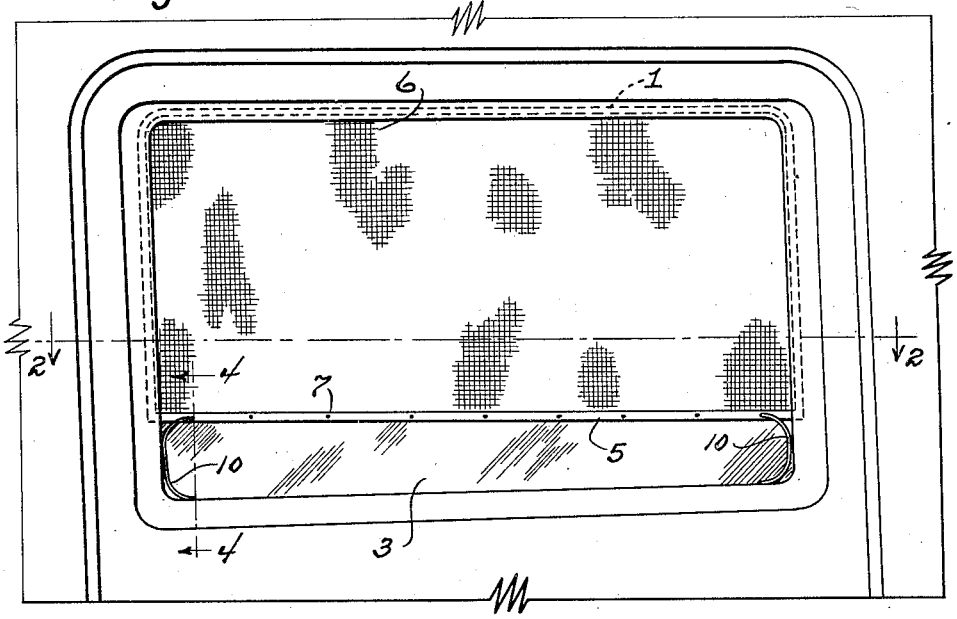
Figure 1 is a front elevation illustrating the application of our improvement.
Figure 2:
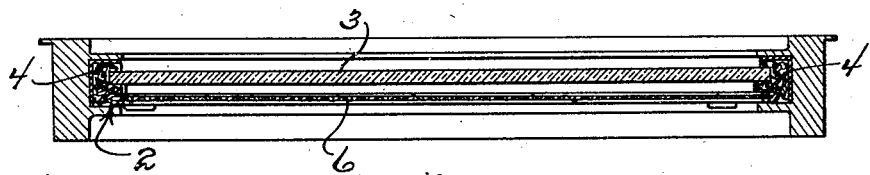
Figure 2 is a sectional view approximately on the line 2—2 of Figure 1.
Figure 3:
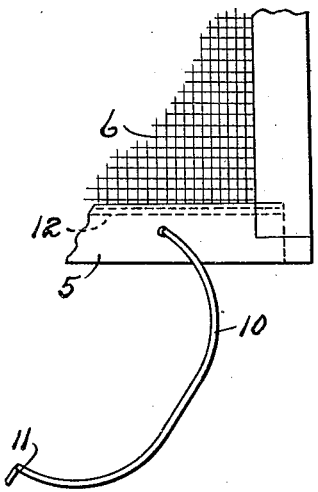
Figure 3 is a detail view looking toward one of the lower corners of the screen.

As is well known the sash or glass openings of automobile doors as well as the other openings in closed types of automobiles frequently have one of their ends of a greater height than the other. Our improvement is designed to fit in the grooved frames for such openings regardless of the variation of the sizes and shapes thereof.

In carrying out our invention we employ a frame of comparatively thin spring steel or like flexible metal. The frame includes an upper substantially U-shaped portion 1. The frame member 1 is, of course, shaped to correspond with the groove 2 of the door or other part of the automobile in which the slidable glass or panel 3 slides. The sash or panel is movable in a grooved compressible member 4 arranged in the frame therefor so that the same is prevented from breakage when either in open or closed position. The lower member of the screen frame is indicated by the numeral 5 and is in the nature of a straight element but is, of course, substantially U-shaped in cross section which, of course, is true with respect to the frame member 1. The edges of both of the frame sections 1 and 5 are slightly flared away from each other so that the screen 6 which is let in the cross sectionally U-shaped frame members is not contacted by the edges of the said frame. The screen mesh is retained in the frame sections by suitable bolts or rivets 7.

To add to the flexibility of the frame the vertical stiles of the section 1 have one of their flanges notched, as at 6', for a considerable distance and its inner side cut-away below the shoulder 7' provided at the terminal of the notch. This leaves one of the sides projecting a considerable distance below the cutaway portion and this projecting portion is indicated for distinction by the numeral 8. The end of the portion 8 is, of course, slightly rounded. The other frame member has its ends cut and notched in a similar manner, but reversely to that of the first mentioned frame member. The shoulders 7' and 9 of the notched and cut-away portions are designed to contact with each other, but these lower corners of the frame are not riveted or otherwise connected.

The upper and lower bars of the frame initially bow away from each other before the screen 6 is inserted therebetween and the insertion of the screen and the riveting thereof will hold the said upper and lower members in parallelism.

Figure 8:
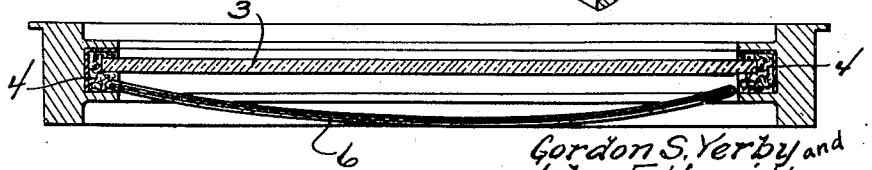
Figure 8 is a sectional view approximately similar to Figure 2 but showing the manner in which the frame is flexed as when the same is to be arranged in the glass or sash frame or removed therefrom.

It is necessary to bow the frame before the same is inserted in the channeled frame for the sash or glass 3 as disclosed by Figure 8 of the drawings. When pressure is relieved from the frame the same will expand and the edges thereof will frictionally contact with the inner walls provided by the grooves in the frame for the sash or glass 3. Thus the screen frame to a great extent is self-sustaining but in order to hold the same positively in the sash frame we hingedly secure to the lower bar of the screen frame adjacent to the corners thereof the ends of arched or curved spring members 10, the second or free ends of which being offset angularly, as at 11. These angle portions contact with the lower wall of the sash frame and effectively hold the screen positioned regardless of the irregularities of the sash frame, as disclosed by Figure 1 of the drawings.

Figure 4:
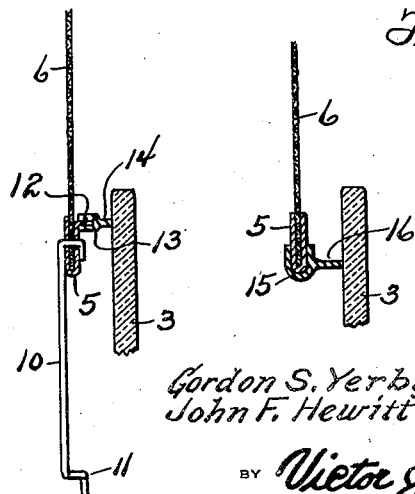
Figure 4 is a sectional view approximately on the line 4—4 of Figure 1.

The inner flange of the lower member 5 of the screen frame may have a flanged extension 12 as disclosed by Figure 4 of the drawings to be received in a longitudinal groove in the widened inner portion 13 of a rubber or like compressible strip 14 which is designed to contact with the inner face of the glass 3, when the said glass is not fully lowered. The element 14 will prevent the passage of dust, insects or the like through the passage between the screen frame and the sash.

Figure 5:
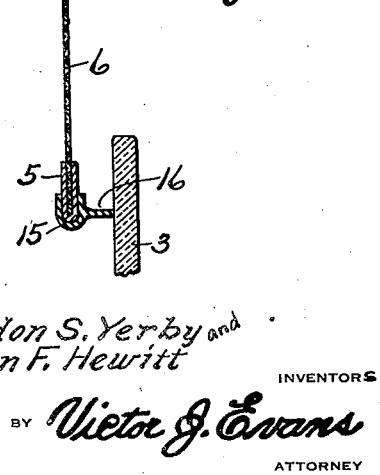
Figure 5 is a substantially similar sectional view but illustrating a modified form of the spacer and closure element between the glass pane and the screen frame.
Figure 6:
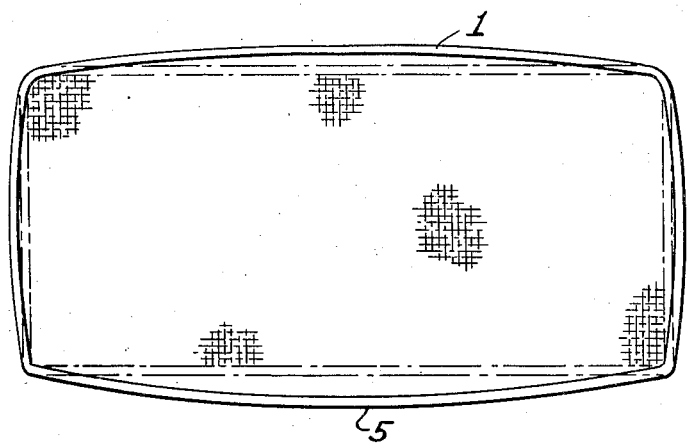
Figure 6 is a plan view of the frame illustrating by the dotted lines the position of the upper and lower members prior to the insertion of the screen therein.
Figure 7:
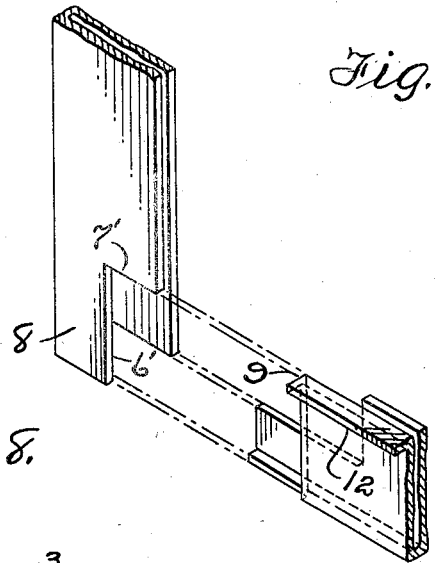
Figure 7 is a perspective view showing the manner in which the lower corners of the frame are connected, the elements being separated.

If desired the element 14 may be modified, as disclosed by Figure 5 of the drawings so that the same has an outer widened portion 15 which is grooved longitudinally to receive therein the lower rounded edge of the screen frame and the inner side of this element is formed with a right angle extension 16 to contact with the glass.

The simplicity and advantages of our improvement will, it is thought, be understood and appreciated by those skilled in the art when the foregoing description has been read in connection with the accompanying drawings. It will be noted that we have produced a screen for the openings or sashes in either the doors or windows of an automobile that may be readily inserted and as easily detached. The screen will be effectively sustained in the opening regardless of the shocks and jars to which the automobile is subjected. The mesh of the screen is sufficiently fine to prevent the passage of dust, dirt or insects therethrough but does not prevent the passage of outside air into the machine nor does the screen materially interfere with the vision of the driver.

By fully lowering the sash the driver as above inferred may pass his hand through the glass or sash frame below the screen and thereby indicate to traffic the direction which the machine is to pursue. It will likewise be noted that the construction is simple and that the device may be cheaply manufactured and commercialized.

Having described the invention, we claim:

1. A screen for the glass or sash openings of the closed type of automobiles having a flexible frame designed to be bowed to permit of the same being inserted in the glass frame and thereafter expanded to frictionally engage with such frame and swingable substantially U-shaped spring members on the lower edge of the frame for contacting with the lower walls of the sash frame.

2. A screen for the glass or sash openings of the closed type of automobiles having a flexible frame designed to be bowed to permit of the same being inserted in the glass frame and thereafter expanded to frictionally engage with such frame and swingable substantially U-shaped spring members on the lower edge of the frame for contacting with the lower walls of the sash frame, and removable rubber strips carried by the lower bar of the screen frame for contacting the glass or sash and to stop the opening between the said glass or sash and the screen frame.

3. A screen for the glass or sash frames of closed automobiles which is of a height less than that of the said frame, said screen comprising a frame that includes an upper substantially U-shaped member which is U-shaped in cross section and which has its edges slightly flared outwardly and a lower cross sectionally U-shaped member which also has its edges slightly flared outwardly, said frame designed to receive and to have riveted therein a closely woven mesh and the upper and lower members of the frame adapted to be arched away from each other prior to the insertion of the mesh therebetween and the corners of the sides and lower member of the frame being cut-away and notched for interengagement with each other, said frame designed to be arched longitudinally when inserted in the window frame, curved springs hingedly connected to the lower bar of the screen frame when contacting with the lower wall of the sash frame, and said spring members having their free ends offset laterally.

In testimony whereof we affix our signatures.

GORDON S. YERBY.
JOHN F. HEWITT.